SELF-RINSING SINK

Original Filed May 14, 1956 5 Sheets-Sheet 1

INVENTOR.
James W. Jacobs
BY
Edwin S. Dybvig
HIS ATTORNEY

SELF-RINSING SINK

Original Filed May 14, 1956 5 Sheets-Sheet 2

INVENTOR.
James W. Jacobs
BY Edwin S. Dybing
HIS ATTORNEY

SELF-RINSING SINK

Original Filed May 14, 1956 5 Sheets-Sheet 3

INVENTOR.
James W. Jacobs
BY Edwin S. Dybvig
HIS ATTORNEY

SELF-RINSING SINK

Original Filed May 14, 1956 5 Sheets-Sheet 4

INVENTOR.
James W. Jacobs
BY Edwin S. Dybvig
HIS ATTORNEY

INVENTOR.
James W. Jacobs
BY
Edwin S. Dybwig
HIS ATTORNEY

United States Patent Office

Re. 24,627
Reissued Apr. 7, 1959

24,627

SELF-RINSING SINK

James W. Jacobs, Dayton, Ohio, assignor to General Motors Corporation, Detroit, Mich., a corporation of Delaware Original No. 2,847,681, dated August 19, 1958, Serial No. 584,514, May 14, 1956. Application for reissue November 26, 1958, Serial No. 776,646

6 Claims. (Cl. 4—187)

Matter enclosed in heavy brackets [ ] appears in the original patent but forms no part of this reissue specification; matter printed in italics indicates the additions made by reissue.

This invention relates to a domestic appliance and more particularly to a sink that is provided with a rinsing ring that is adapted to direct a rinsing fluid against the inner walls of the sink.

An object of the invention is to provide means associated with a sink or receptacle for directing a rinsing fluid against one or more of the inner walls of the same.

Another object is to provide a rinsing ring that is adapted to be attached to a sink for directing fluid against the walls of the sink.

A further object is to provide control means for selectively supplying a rinsing ring or a conventional spout from a suitable fluid supply source.

Still another object is to prevent the back-flow of fluid from the sink through a rinsing ring and into the water supply feeding the rinsing ring to preclude contaminating the water supply.

Further objects and advantages of the present invention will become apparent from the following description, reference being had to the accompanying drawings wherein a preferred embodiment of the present invention is clearly shown.

Figure 1:
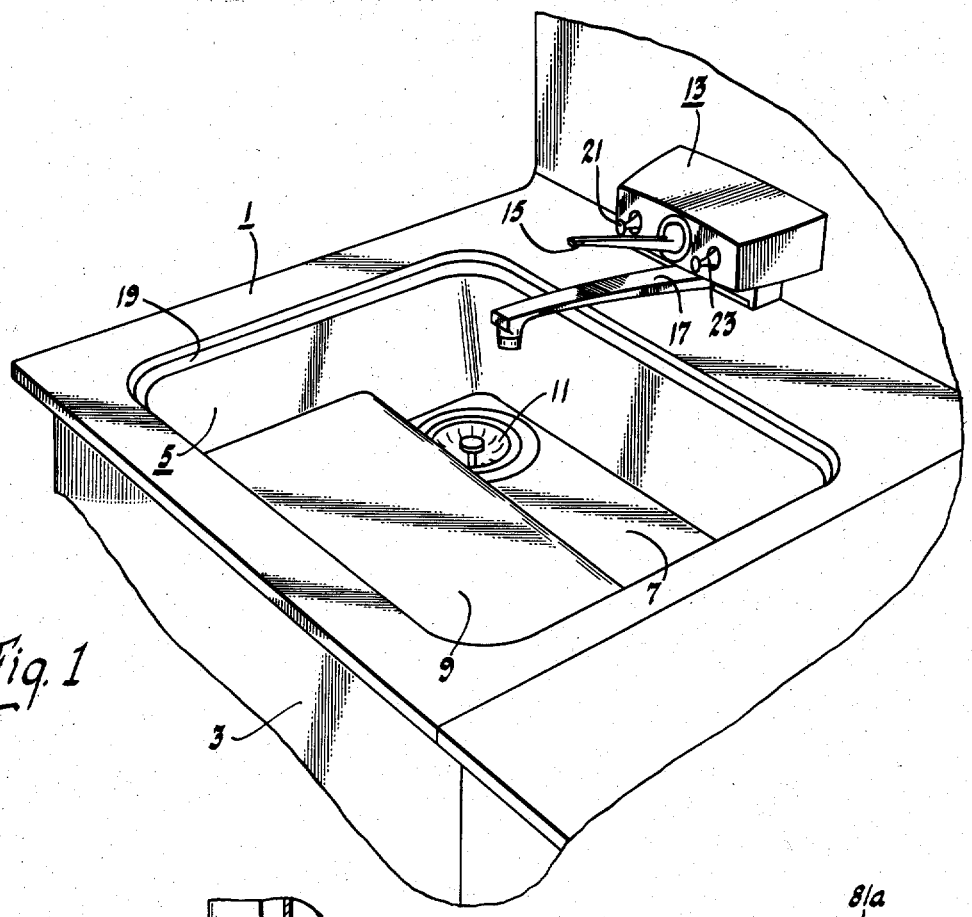
Figure 1 is a perspective view showing a sink structure that is provided with a valve control box for selectively supplying fluid to a rinsing ring or to a conventional spout.

The rinsing ring of this invention is adapted to be used with the sink structure shown in Fig. 1. The sink structure comprises a sink counter-top 1 made of suitable heat and water resistant material, the counter-top being secured to and supported by a lower cabinet structure 3. A sink bowl, generally denoted by reference numeral 5, is secured to the sink counter-top by means more particularly shown in Fig. 4. The bottom of the sink bowl is made in two levels comprising a bottom wall 7 and a wall portion 9 disposed above the bottom wall 7. The lower wall 7 is provided with a drain 11 that is disposed at one corner of the sink bowl. A valve control box, generally denoted by reference numeral 13, is secured to the sink counter-top. The control box is provided with a handle 15 that controls the temperature and volume of the water being supplied to a spout 17 and to a circumferentially extending rinsing ring 19 in a manner to be more fully described hereinafter. The control box is also provided with a pair of manually actuable knobs 21 and 23. The knob 21 forms a part of a conventional toggle switch which is used to complete a circuit for a garbage disposal electric motor, while the knob 23 is used to actuate a diverter valve, shown in Fig. 2.

Figure 6:
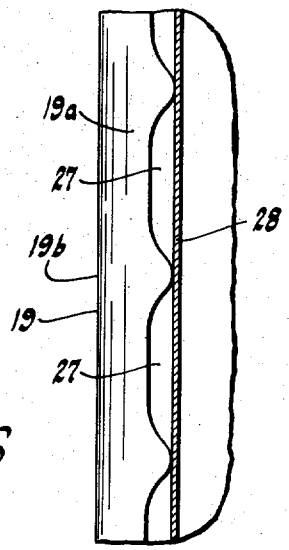
Figure 6 is a fragmentary sectional view taken along lines 6—6 of Figure 4.
Figure 4:
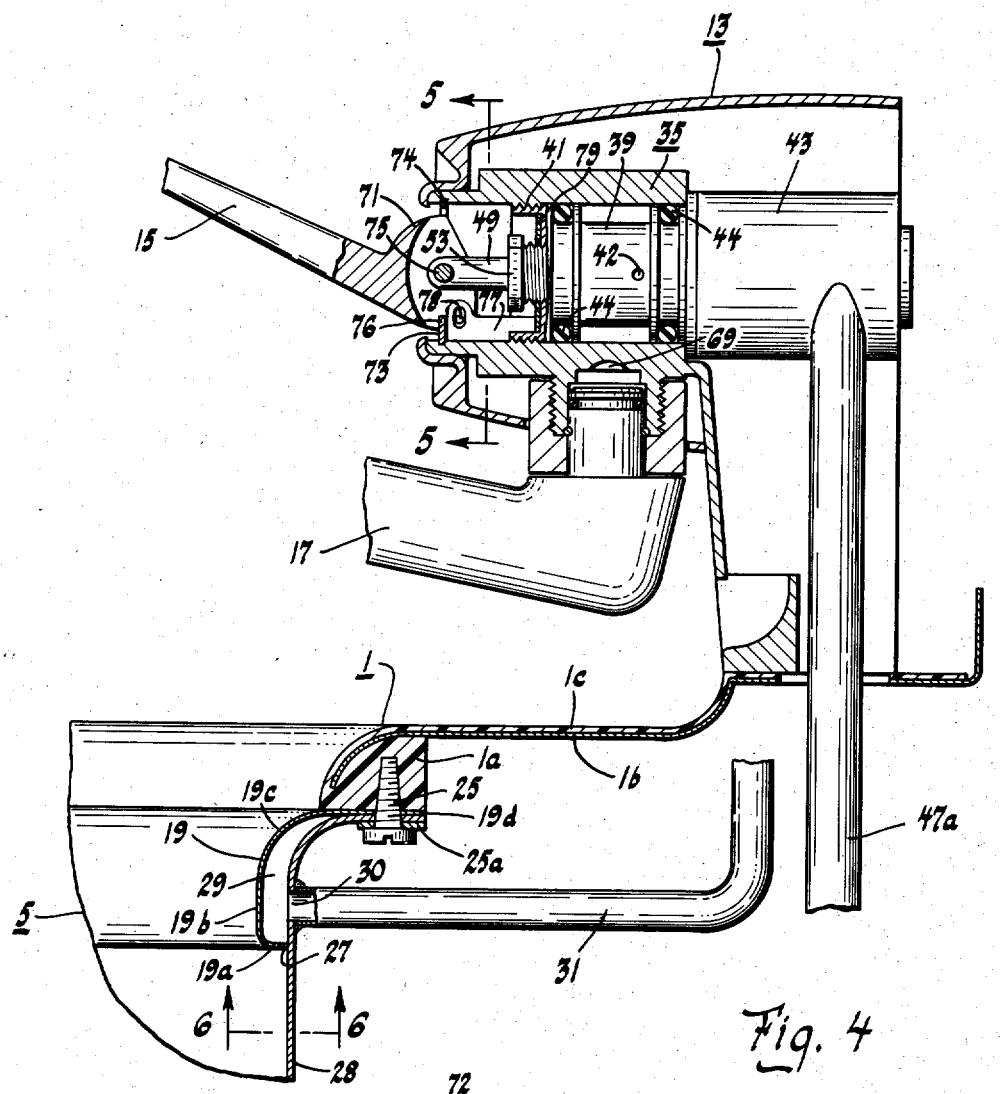
Figure 4 is a sectional view taken along lines 4—4 of Figure 2 and showing the arrangement of the rinsing ring and sink bowl.

The sink counter-top 1, as shown in Fig. 4, comprises a metal reinforcing strip 1b to which is molded sink counter material 1a and 1c. The sink counter material 1a is made thick enough to accommodate a sink mounting bolt 25. The head of bolt 25 engages a flat metal reinforcing ring 25a that extends entirely around the sink, while the threaded portion of the bolt is threaded into counter material 1a. It is to be understood that a plurality of bolts 25 hold the sink bowl 5 and rinsing ring or shield member 19 in tight engagement with the sink counter-top and serve as mounting means for both the sink and the rinsing ring. The rinsing ring 19 extends entirely around the sink bowl and is preferably made of suitable metal material. The ring is formed with a lower portion 19a that engages a vertical wall 28 of the sink bowl and with a vertically extending portion 19b. Vertically extending portion 19b merges into a curved portion 19c that extends into a horizontally disposed rim portion 19d. A suitable sealing compound may be disposed between the rim portion and the counter-top and between the rim portion and the sink. The lower portion 19a of the rinsing ring is arranged with slots 27, as more particularly shown in Fig. 6. These slots may take any form and might be triangularly shaped by forming them with a triangularly shaped file. From the foregoing, it is apparent that the rinsing ring 19 and side wall 28 of the sink bowl form a cavity 29. The side wall 28 of the sink has an aperture 30 that is connected with a rinsing ring supply pipe 31. Fluid entering the cavity 29 from supply pipe 31 will find its way through passages 27 and flow along the inner side of wall 28 to rinse the same. The rinsing ring will thus direct water along the inner walls of the sink to rinse any material collecting on the sink walls downwardly into drain 11, which may be connected with a conventional garbage disposal unit (not shown), under control of knob 21. The rinsing ring has particular utility when used with a two-level sink, as disclosed herein. Thus, the upper level 9 of the sink may be used as a cleaning support for vegetables and the like, the scraps remaining after cleaning the vegetables being washed into drain 11 by water issuing from the rinsing ring.

Figure 2:
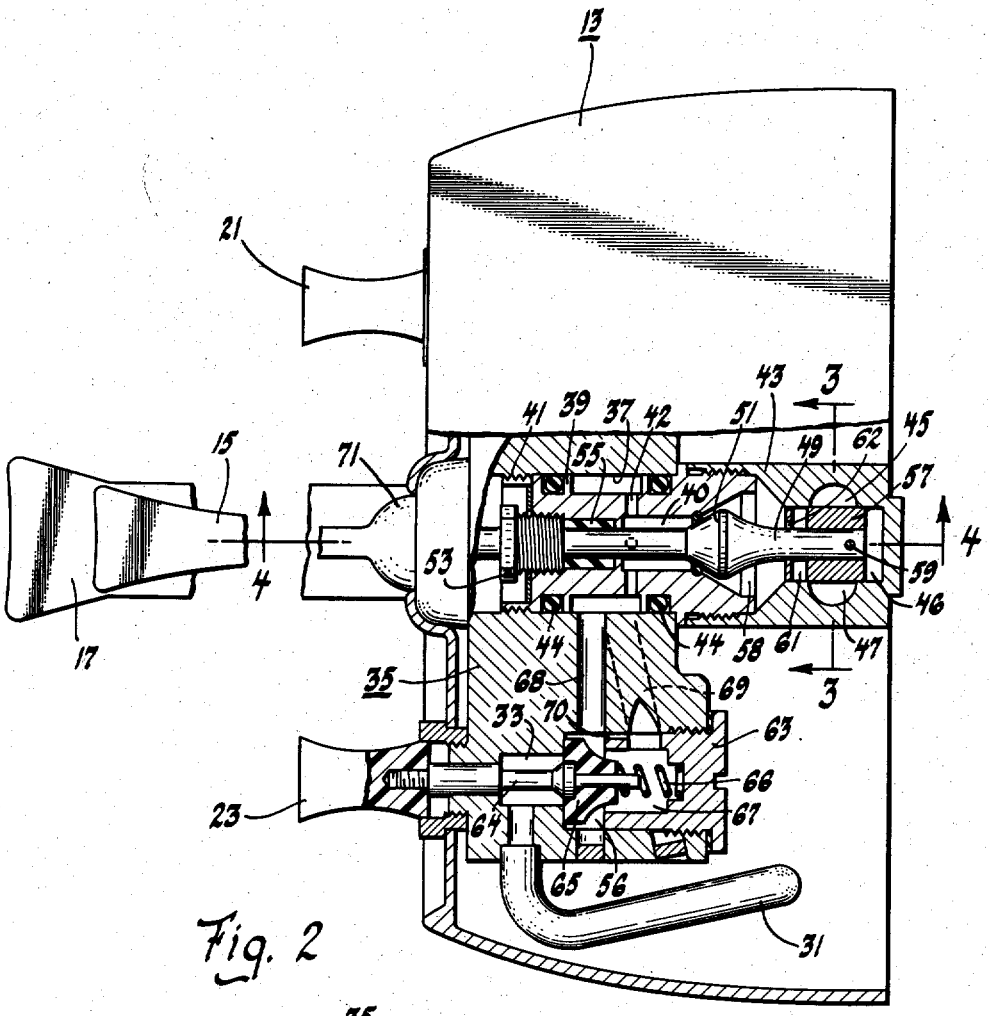
Figure 2 is a top view of the valve control box shown in Figure 1 with parts broken away.

The rinsing ring supply pipe 31 is connected with a chamber 33 formed in the main housing 35 of valve control box 13, as better shown in Fig. 2. The valve control box comprises a main housing or casting 35 having a bore 37 formed therein. A sleeve 39 is mounted within bore 37 by suitable means such as threads 41 formed on sleeve 39. The valve sleeve 39 has a chamber 40 formed therein, that communicates with bore 37 by means of a plurality of radial passages 42. A pair of O-rings 44 encircle reduced portions of the valve sleeve to preclude leakage of fluid from within valve sleeve 39. A valve housing member 43 is threaded onto sleeve 39 and is formed with ports 45 and 47 and a cylindrically shaped chamber 46. The ports 45 and 47 are adapted to be connected, respectively, to cold and hot fluid supply lines 45a and 47a. A valve rod 49 having a valve portion 51 is disposed within sleeve 39 and valve member 43, and is free to rotate or to be moved longitudinally therein. The valve rod is connected to an actuating handle 15 and passes through a packing nut 53 and packing 55 that act to preclude leakage of fluid between valve rod 49 and sleeve 39. A movable cylindrical valve part 57 is secured to valve rod 49 by means of a pin 59, thus insuring that the valve part 57 will partake of any axial and rotational movement of valve rod 49. The cylindrical valve part 57 has a circumferentially and radially extending passage 61 that communicates with a port 62 formed in the valve part 57.

The valve housing 35 is provided with another bore 56 that is closed at one end by a plug 63. A diverter valve rod 64 is disposed within chamber 33 and bore 56. The diverter valve rod 64 carries a valve 65 made of rubber or other suitable material, that normally seats against the open end of chamber 33. The valve is spring biased to the position shown in Fig. 2 by a spring 66 that is disposed within a chamber 67 formed in plug 63. The knob 23 is secured to the rod 64 in order that the valve may be manually shifted to seat against the open end of chamber 67. A drilled passage 68 connects the bore 37 with bore 56. Another drilled passage 69 extends downwardly from chamber 67 and bore 56 and connects this chamber with the spout 17. The passages 68 and 69 are connected by a vacuum breaker passage 70. The vacuum breaker passage insures that the passage 68 will always be connected with atmospheric pressure via passage 69 and spout 17.

Figure 3:
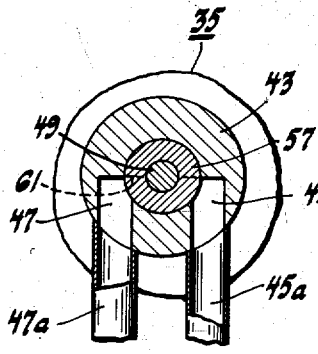
Figure 3 is a fragmentary sectional view taken along line 3—3 of Figure 2.
Figure 5:
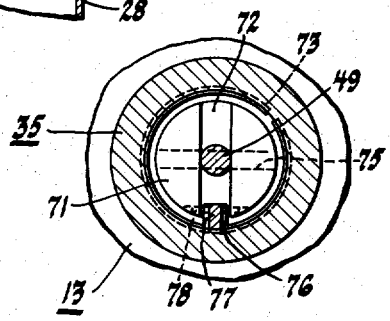
Figure 5 is a fragmentary sectional view taken on lines 5—5 of Figure 4.

The valve rod 49 is actuated by a handle 15 having a shank portion 71, as more particularly shown in Fig. 4. The handle is adapted to be rotated to rotate valve rod 49 or to move valve rod 49 longitudinally by an upward or downward movement of handle 15. A retaining ring 73 is fitted within a peripheral slot 74 formed in the main housing 35 and encircles shank portion 71. The retaining ring has an inwardly projectinng portion 76 that lies within a slot 72 formed in shank portion 71, as more particularly shown in Fig. 5. With this construction, it is apparent that the retaining ring rotates with a rotation of handle 15 but does not preclude upward and downward movement of handle 15. The valve rod 49 is secured to shank 71 by a pin 75. A pivot link 77 is pivotally connected to shank 71 by means of a pin 78 and abuts the retaining ring 73 at one end and another retaining ring 79 at an opposite end. Thus, when handle 15 is pulled downwardly, the handle pivots around pin 78 and operates to move valve rod 49 leftwardly, as shown in Fig. 4. When handle 15 is moved upwardly, the shank 71 again pivots around pin 78 to move the valve rod 49 rightwardly, as shown in Fig. 3. The pivot link 77 is precluded from longitudinal movement when the handle is moved upwardly or downwardly by the retaining rings 73 and 79.

The operation of the valve mechanism shown in Figs. 2 and 4 will now be described. Fluid entering ports 45 and 47 is normally blocked from the remainder of the valve mechanism by cylindrical valve member 57. When valve member 57 is shifted to the right, as shown in Fig. 2, the passage 61 communicates with either port 45 or port 47 or with both, depending upon the angular position of passage 61. The passage 61 extends circumferentially around cylindrical valve member 57 to approximately half of the total circumference of valve member 57, in installation where ports 45 and 47 are spaced approximately 180° apart. Thus, passage 61, when shifted rightwardly in Fig. 2 may communicate with both ports 45 and 47 to permit the mixture of hot and cold water to flow into a chamber 58 formed between valve sleeve 39 and valve member 43. If the valve member 57 is rotated to a position wherein passage 61 communicates only with port 45, only cold water will be supplied to chamber 58. In a like manner, when the valve member 57 is rotated so that passage 61 only communicates with the hot water port 47, only hot water is supplied to chamber 58. Thus, it is seen that the valve member 57 operates to control the mixing of hot and cold water by a rotation thereof and may be rotated to various positions over a 180° range to supply chamber 58 with hot or cold water or a mixture of each. When valve member 57 is shifted rightwardly in Fig. 2, the valve 51 is likewise shifted to place the chamber 58 in communication with chamber 40 and radial ports 42. The water issuing from radial ports 42 flows through passage 68 toward diverter valve 65. If the diverter valve is in the position shown in Fig. 2, the water in passage 68 will pass into chamber 67, thence into passage 69 and into spout 17 that is connected with passage 69. If the diverter valve is shifted by longitudinal movement of knob 23, the flow passage to chamber 67 is cut off, while chamber 33 is opened to passage 68 for the passage of fluid into tube 31 that connects with the rinsing ring 19. It is thus apparent that passage 68 is supplied with a predetermined volume of water having a predetermined temperature, the temperature of the water being controlled by rotational movement of handle 15 and the volume by upward and downward movement of handle 15. Moreover, it is apparent that diverter valve 65 operates to selectively supply the rinsing ring 19 or the spout 17 from passage 68.

Figure 7:
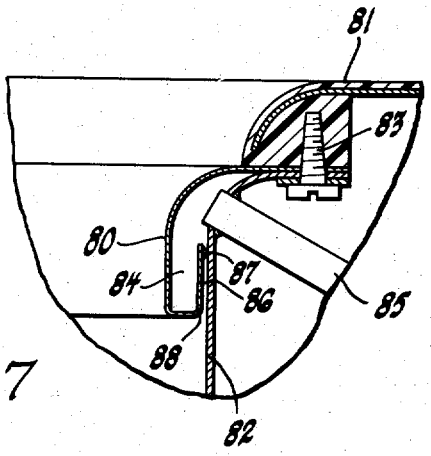

Referring now to Fig. 7, a modified rinsing ring 80 is shown secured to a sink counter-top 81 and to a sink bowl 82 by means of a screw 83. It is to be understood that the rinsing ring extends entirely around the inner peripheral wall of the sink and that a plurality of screws 83 are used for mounting the ring. The rinsing ring is bent to form a cavity or trough 84 that may be supplied with fluid by means of a tube 85. A wall 86 of the trough 84 is held spaced from sink bowl 82 by a plurality of protuberances 87. Thus, water being supplied to trough 84 will fill the trough and overflow wall 86, where it will pass between wall 86 and sink bowl 82 to rinse the inner wall of the sink. The provision of a trough or cavity insures that water will be evenly distributed around the entire periphery of the rinsing ring and sink in order to provide a uniform rinsing action over all of the walls of the sink. The trough 84 may be provided with small openings 88 spaced along the rinsing ring to allow the trough to drain when it is not being supplied by tube 85. It is to be understood that the tube 85 may be connected to the valve mechanism shown in Figs. 2 and 4 in a fashion similar to the connection of tube 31 to the valve mechanism as shown in these figures.

Figure 8:
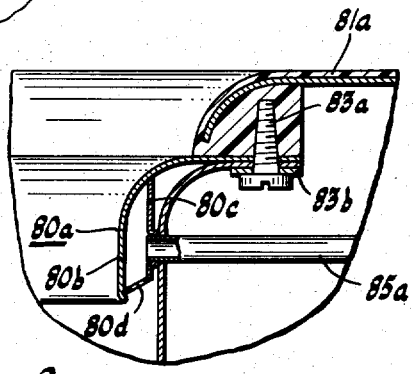
Figures 7 and 8 are fragmentary sectional views of modified rinsing rings made in accordance with this invention.

Figure 8 illustrates another modified rinsing ring, generally denoted by reference numeral 80a. The rinsing ring is made of a metal inner part 80b and a metal outer part 80c that are welded or brazed together. The two metal parts form an enclosed tube that extends entirely around the sink. The outer part 80c of the rinsing ring is provided with an aperture 80d that directs water from within the rinsing ring against the inner walls of the sink. It is to be understood that the rinsing ring is provided with a plurality of apertures 80d that are located at spaced points around the rinsing ring. The rinsing ring is secured to sink counter top 81a by means of a bolt 83a. The head of the bolt engages a metal reinforcing ring 83b, while the threaded end of the bolt is threaded into the counter top material. The rinsing ring 80a is connected with a pipe 85a that may be supplied by the valve mechanism shown in Figs. 2 and 4.

It is important to provide means for preventing backflow of water from the sink into the water supply line should a vacuum occur therein. Thus, in the case where diverter valve 65 connects passage 68 to rinsing ring pipe 31, and where valves 51 and 57 are open, there is some danger that a vacuum existing at ports 45 or 47 might create a backflow of fluid up through rinsing ring 19, through tube 31, chamber 33, passage 68, radial passages 42 and into the water supply. This backflow is effectively precluded by a small passage 70 which connects passages 68 and 69, the passage 69 communicating with spout 17 and the atmosphere. Thus, the provision of small passage 70 insures that any vacuum existing in passage 68 will be broken by atmospheric pressure in spout 17.

Figure 9:
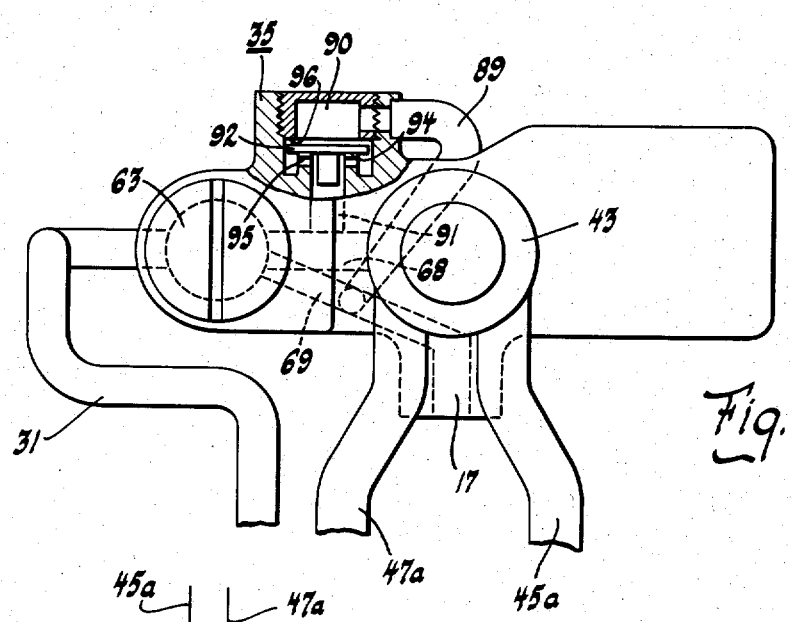
Figure 9 is a rear view, with parts broken away, showing a vacuum breaker valve that is adapted to be used in the valve control box shown in Figures 2 and 4.
Figure 10:
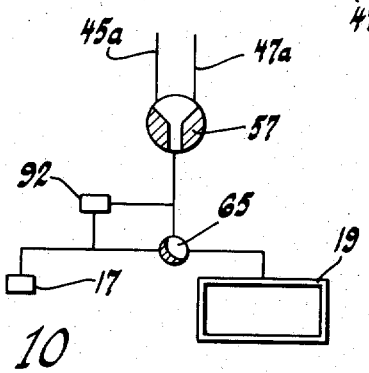
Figure 10 is a schematic illustration of the valve control box shown in Figure 9.

Figure 9 illustrates another method of preventing backflow of fluid from the sink into the water supply. In this figure, a tube 89 is connected between passage 69 and a vacuum breaker valve chamber 90. A passage 91 is connected between passage 68 and chamber 90. A check valve 92 rests on a raised valve portion 94 and is movable upwardly to a position where it closes off communication between tube 89 and passage 91. A plurality of ports 95 are disposed below the valve portion 94 and connect passage 91 with chamber 90 when the valve is resting on the valve portion 94. Fluid being supplied from supply lines 45a and 47a through valves 51 and 57 and into passage 68 normally holds valve 92 against valve seat 96 so that no fluid may pass into tube 89. However, if a vacuum should exist in either fluid supply line 45a or 47a and if either supply line is at that time connected by valves 57 and 51 with passage 68, the valve 92 will move downwardly and rest on valve portion 94. In this position of the valve the passages 91 and 68 are connected with atmospheric pressure via tube 89, passage 69 and spout 17. With this arrangement, no vacuum can exist in passage 68 to pull fluid from sink 5 when diverter valve 65 is in a position connecting passages 68 and tube 31. This structure is illustrated schematically in Fig. 10 wherein the valve 57 is connected with fluid supply lines 45a and 47a. The diverter valve is denoted by reference numeral 65 and the vacuum breaking valve by reference numeral 92.

Figure 11:
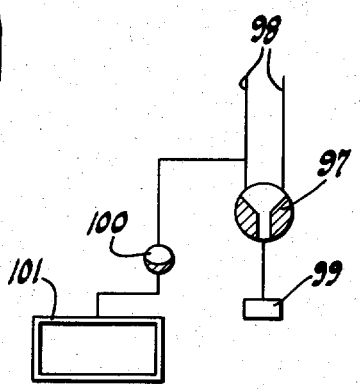
Figure 11 is a schematic illustration of a modified rinsing ring control means made in accordance with this invention.

Fig. 11 illustrates schematically a modified arrangement for selectively supplying a rinsing ring and spout of a sink made in accordance with this invention. In this figure a mixing valve 97 is connected with hot and cold fluid supply lines 98. The mixing valve may be similar to valve 57 shown in Figs. 2 and 4 and is connected with a conventional spout 99. A diverter valve 100 similar to valve 65 as shown in Figs. 2 and 4 is connected between one of the fluid supply lines and a rinsing ring 101 that is preferably of the type shown in either Figs. 4, 7 or 8. With this arrangement the rinsing ring is supplied independently of mixer valve 97.

Figure 12:
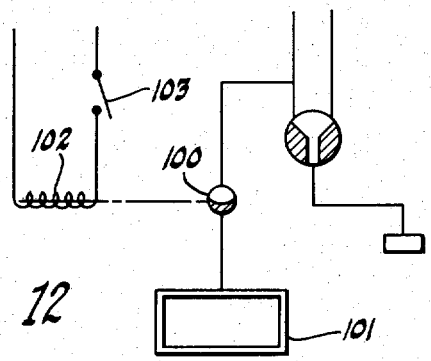
Figure 12 is a schematic illustration of a modified flow control circuit wherein the diverter valve is electrically actuated.
Figure 15:
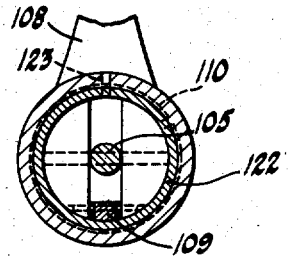
Figure 15 is a sectional view taken along lines 15—15 of Figure 13.

Fig. 12 is a schematic representation of a system that is in all respects identical with that of Fig. 11, except that the diverter valve 100 is actuated by a solenoid 102. The solenoid is connected with a suitable source of voltage and is energized in response to the closing of switch 103.

Figure 13:
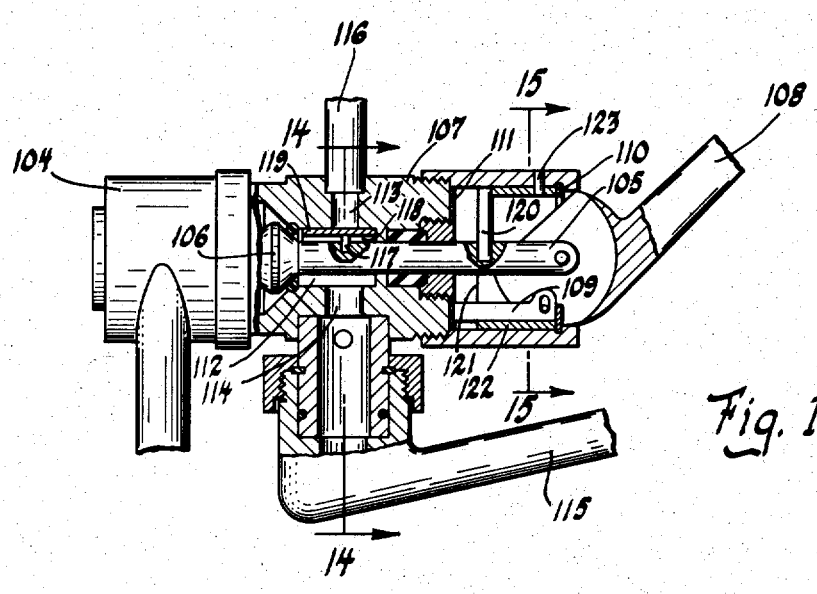
Figure 13 is a sectional view of a modified control valve for the rinsing ring.
Figure 14:
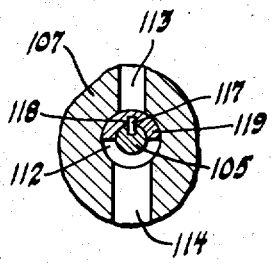
Figure 14 is a sectional view taken along lines 14—14 of Figure 13.

Fig. 13 illustrates a modified method of selectively supplying a rinsing ring and spout of a self-rinsing sink apparatus. The valve assembly of this figure comprises a mixing valve denoted generally by reference numeral 104. The details of valve 104 are not shown but it is to be understood that the valve operates in a fashion similar to valve 57 of Figs. 2 and 4. A valve rod 105 having a valve 106 is mounted within valve housing 107. The valve rod 105 and valve 106 are similar to valve rod 49 and valve 51 shown in Fig. 2. The valve rod is actuated by a handle 108 that carries a pivot link 109 disposed between retaining rings 110 and 111. The handle, pivot link and retaining rings cooperate in a fashion similar to that of the handle, pivot link and retaining rings shown in Figs. 2 and 4. A chamber 112 is disposed within valve housing 107 and connects with passages 113 and 114. Passage 114 connects with a spout 115 while passage 113 is connected to a pipe 116. It is to be understood that the pipe 116 is connected with a rinsing ring of the type shown in Figs. 4, 7 and 8. The valve rod 105 carries a pin 117 that is positioned within a slot 118 formed in a valve sleeve 119. The pin is slidable within the slot 118 but when the valve rod 105 is rotated, the valve sleeve 119 rotates therewith. Valve 119, as more particularly shown in Fig. 14, connects chamber 112 with passage 113 or with passage 114, depending upon the angular position of rod 105. Rotation of the handle 108 180° from its vertical upright position shown in Fig. 13 operates to shift valve 119 to connect chamber 112 and pipe 116. It is to be understood that mixer valve 104 controls the temperature of the water when the handle 108 is in its upright position and when the valve is moved 90° to either side of its vertical upright position shown in Fig. 13. The mixer valve 104 also operates to control the temperature of the water when the handle 108 is in a vertical downwardly disposed position and when the handle is rotated 90° to either side of this position. Thus, the mixer valve 104 operates to control the temperature of the water when the handle and valve 104 are rotated in the upper 180° range or in the lower 180° range. It will thus be apparent that rotation of handle 108, which in turn rotates valve rod 105, will determine the temperature of the water being supplied to chamber 112, by rotational positioning of mixer valve 104. Rotation of rod 105 simultaneously positions valve 119 to connect chamber 112 with the rinsing ring or with the spout. The valve rod 105 also carries a cam follower 120 that cooperates with a cam edge 121 formed on a sleeve 122. The sleeve 122 is staked to the valve housing by a pin 123. When handle 108 and valve rod 105 are rotated, the cam follower 120 rides up on cam edge 121 to move the valve rod 105 leftwardly in Fig. 13, thus moving valve 106 and mixer valve 104 to a wide open position. The valve 119 is so positioned angularly with respect to cam edge 121 that valves 106 and 104 move to wide open position when the chamber 112 and tube 116 are connected by valve 119. The connecting of chamber 112 and tube 116 and the opening of valves 106 and 104 by cam 121 preferably occurs when the handle 108 just reaches the lower 180° range of movement, that is, when the handle is rotated 90° from its vertical upright position. Thus, when the rinsing ring is connected to chamber 112 and the spout disconnected therefrom, the cam edge 121 opens the valve mechanism to wide open position. With this arrangement, the operator may control the temperature and volume of the water being supplied to chamber 112 and also may control whether the water is directed to the rinsing ring or to the spout by a single manual actuator 108. Furthermore, the valves 104 and 106 are actuated to a wide open position when the manual actuator 108 is rotated to connect the rinsing ring and fluid supply lines.

While the embodiment of the present invention as herein disclosed constitutes a preferred form, it is to be understood that other forms might be adopted.

What is claimed is as follows:

1. In combination, a sink having an inner wall, a member formed with a cavity mounted interiorly of said sink and in fixed relation to said wall, said cavity having a wall spaced from said receptacle inner wall and defining a passageway therewith, means for supplying said cavity with fluid, and means spaced upwardly from the bottom of said cavity for permitting flow between said cavity and said passageway.

2. In combination, a sink counter-top, a sink having an inner wall secured to the under side of said sink counter-top, a separate member formed with a cavity having a rim portion, said rim portion being interposed between said sink and the under side of said counter-top whereby said member is mounted in fixed relation to said sink, said member having a wall spaced from said sink inner wall and defining a passageway therewith, means for supplying said cavity with fluid, and means spaced upwardly from the bottom of said cavity for permitting flow between said cavity and said passageway.

3. In combination, a receptacle, rinsing means mounted in fixed relation to said receptacle, a spout for supplying fluid to said receptacle, a valve housing having an inlet adapted to be connected to a fluid supply line and having a chamber, a valve member normally blocking flow between said inlet and chamber and axially movable to a fully open position for connecting said inlet and chamber, said valve member being rotatable around its longitudinal axis, means rotatable with said valve member for selectively connecting said rinsing means or said spout with said chamber when said valve member is rotated, and means operative in response to a rotation of said valve member to a position where said chamber and rinsing means are connected for axially moving said valve member to fully open position.

4. In combination, a receptacle having an inner wall, a liquid collecting member including a trough portion mounted in fixed relation to said wall, said trough portion having a vertically extending wall spaced from the inner wall of said receptacle whereby liquid collecting in said trough portion overflows said vertically extending wall and moves downwardly between said receptacle inner wall and said vertically extending wall, and means for supplying said trough with liquid.

5. In combination, a receptacle, rinsing means mounted in fixed relation to said receptacle, spout means for supplying fluid to said receptacle, a valve housing having an inlet adapted to be connected to a fluid supply line and having a chamber, a valve member normally blocking flow between said inlet and chamber and axially movable for connecting said inlet and chamber, said valve member being rotatable around its longitudinal axis, and means rotatable with said valve member for selectively connecting said rinsing means or said spout means with said chamber when said valve is rotated.

6. A valve mechanism comprising, a housing having an inlet adapted to be connected to a fluid supply line and having a chamber, a spout outlet and a rinse spray outlet in said housing, a valve member normally blocking flow between said inlet and said chamber and axially movable for connecting said inlet and chamber, said valve member being rotatable around its longitudinal axis, [and] means rotatable with said valve member for selectively connecting said rinse spray outlet or said spout outlet with said chamber when said valve member is rotated, *and means operative in response to a rotation of said valve member to a position where said chamber and rinse spray outlet are connected for axially moving said valve member to fully open position.*

References Cited in the file of this patent or the original patent

UNITED STATES PATENTS

| | | |
|---|---|---|
| 533,062 | Hoelscher | Jan. 29, 1895 |
| 755,109 | Russenius | Mar. 22, 1904 |
| 1,633,582 | Gould | June 28, 1927 |
| 2,173,064 | Judell | Sept. 12, 1939 |
| 2,294,092 | Moody | Aug. 25, 1942 |
| 2,609,206 | Moen | Sept. 2, 1952 |
| 2,741,258 | Bletcher et al. | Apr. 10, 1956 |